United States Patent [19]

Marks

[11] 3,792,293
[45] Feb. 12, 1974

[54] ELECTROSTATIC GENERATOR WITH CHARGING AND COLLECTING ARRAYS

[76] Inventor: Alvin M. Marks, 149-61 Powells Cove Blvd., Whitestone, N.Y. 11357

[22] Filed: Nov. 22, 1971

[21] Appl. No.: 200,766

Related U.S. Application Data

[63] Continuation-in-part of Ser. No. 16,048, March 3, 1970, abandoned.

[52] U.S. Cl. ..................................... 310/5, 310/11
[51] Int. Cl. .................................................. H02n
[58] Field of Search ............ 310/2, 4, 5, 6, 11, 7, 10

[56] References Cited
UNITED STATES PATENTS

| | | | |
|---|---|---|---|
| 3,411,025 | 11/1968 | Marks | 310/5 X |
| 3,206,625 | 9/1965 | Stuetzer | 310/6 |
| 2,885,599 | 5/1959 | Hand | 310/5 X |
| 2,277,712 | 3/1942 | Otto | 310/5 UX |
| 2,308,884 | 1/1943 | Lindenblad | 310/5 |
| 2,208,217 | 7/1940 | Landerholm | 310/5 |
| 3,225,225 | 12/1965 | Wattendorf et al. | 310/6 |

Primary Examiner—D. F. Duggan

[57] ABSTRACT

A device is described for transducing heat-kinetic power into electrical power using a charged aerosol, which flows through a sheet conversion space having emitting and exciter arrays to charge and form droplets at the entrance plane and a collector array to discharge the droplets at the exit plane and to supply electrical power to load; which results in increased efficiency with greater output power and current at a smaller voltage.

8 Claims, 16 Drawing Figures

FIG. 3
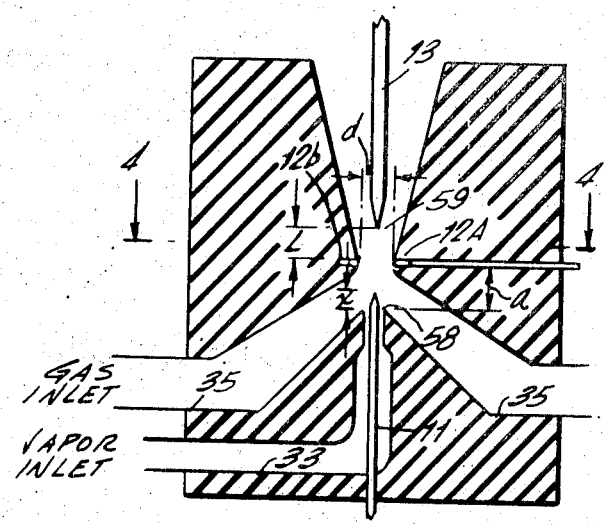
FIG. 4
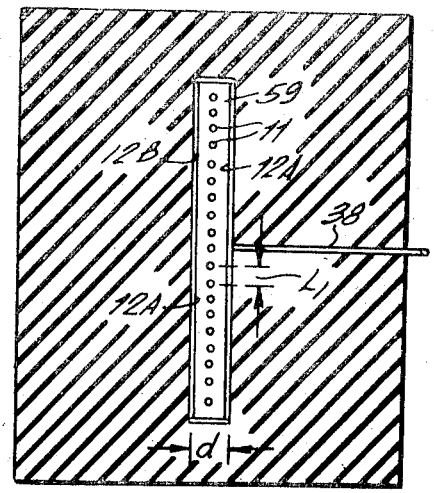
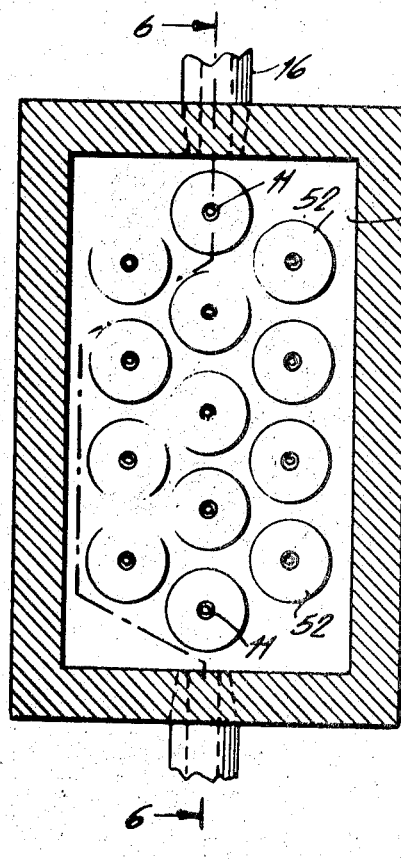
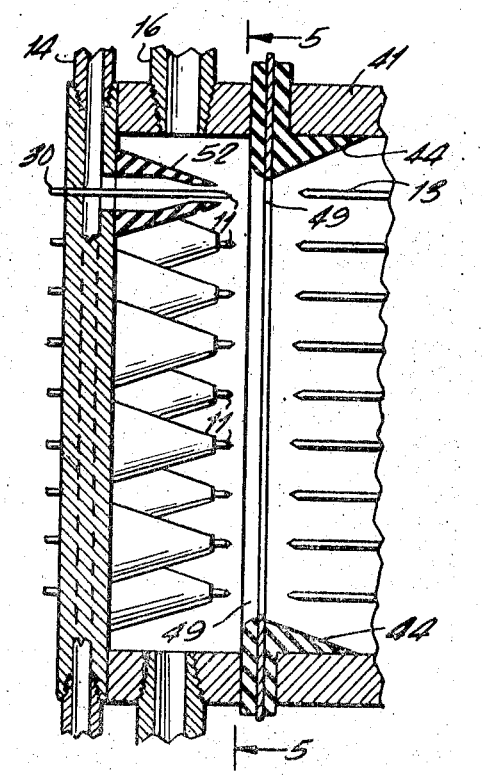
FIG. 5
FIG. 6

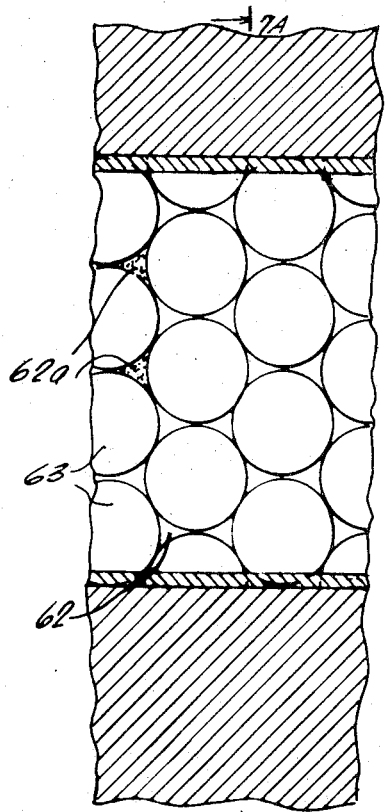
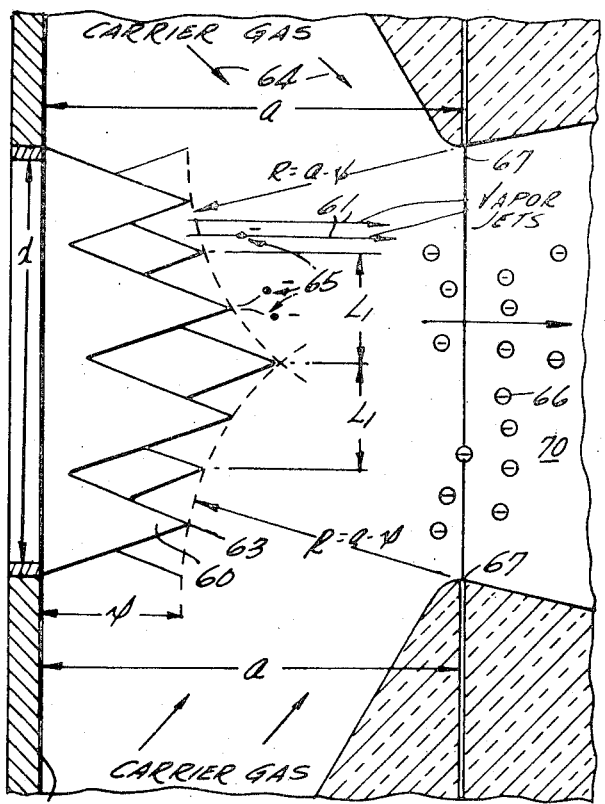
FIG.7  FIG.7A
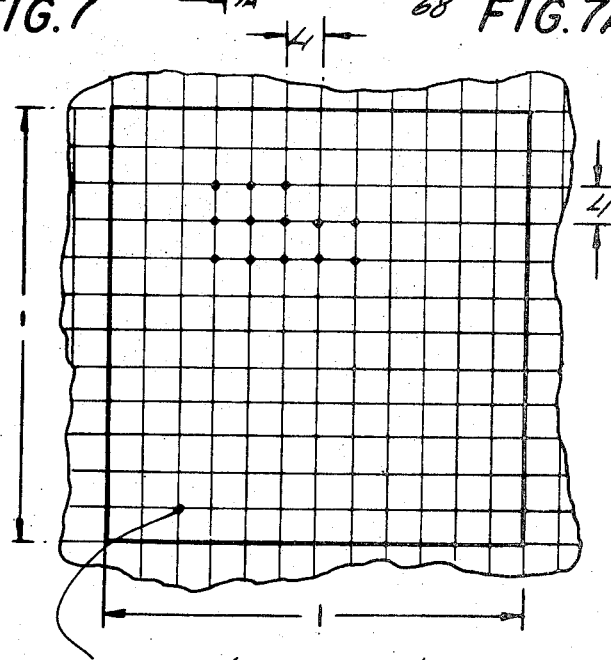
n-POINTS PER UNIT AREA
FIG. 8A
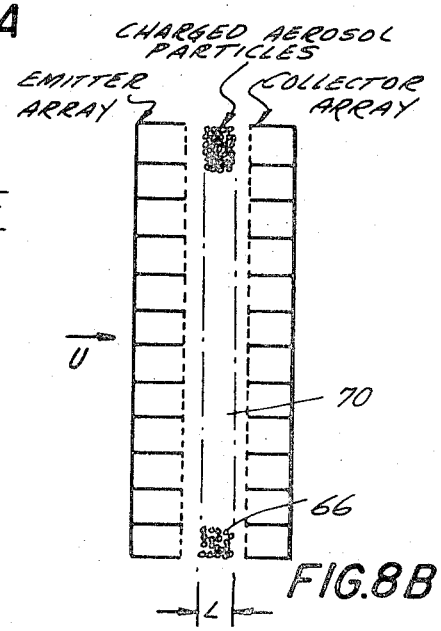
FIG.8B

ELECTROSTATIC GENERATOR WITH CHARGING AND COLLECTING ARRAYS

This application is a continuation in part of an application filed Mar. 3, 1970, Ser. No. 16,048, now abandoned entitled: MULTIPLE POINT DYNAMIC GENERATOR, invented by ALVIN M. MARKS.

BACKGROUND OF THE INVENTION

Several heat-electrical power conversion devices have been described employing a high velocity charged aerosol gas as a transducer in U.S. Pat. Nos. 3,417,267, 3,411,025 and 3,191,077 issued to Alvin M. Marks. U.S. Pat. No. 3,417,267 describes a device using an Expansion-Condensation Process to produce a charged aerosol by gas-vapor expansion and cooling and condensing the vapor to form charged droplets on ions emitted from a point in an electric field. U.S. Pat. No. 3,411,025 describes a device using a Mixture-Condensation Process which produces a charged aerosol from a superheated vapor mixed with a cooler carrier gas to form charged droplets by condensation of the vapor onto ions emitted from a point in an electric field.

In U.S. Pat. No. 3,191,077 a method known as the Electrojet Process is described for forming a charged aerosol in which the emitter is a small diameter tube containing a liquid carried by a moving gas in an electric field to form charged droplets. In a copending patent application, Ser. No. 648,403 filed June 23, 1967, various processes are described embodying these and other principles which are employed to charge and form submicron droplets of optimum mobility for efficient power transduction.

In U.S. Pat. No. 3,225,225, issued to Wattendorf, et al, there is shown well scattered points along a series of slit nozzles. There is one point in the center of each slit nozzle. The distance between the points exceeds the width of the slit.

In prior art devices a narrow passage or long thin channel in the form of a nozzle or tube was employed for the conversion space. The proximity of the electrodes to the wall often caused electrical discharges to and along the wall surface shorting a portion of the converted power, resulting in a loss of efficiency.

In the present invention the term "per unit area" means per $mm^2$.

For many purposes a large power output is required at small voltage and large current. Because of the space charge effect, at incipient spark breakdown, the generated voltage and the current are in direct and inverse proportions to the conversion lengths, respectively. In the present invention this requirement is met by employing as a charged aerosol conversion space a large area in the shape of a thin disc or a sheet, having a diameter to thickness ratio of at least three to one and preferably 10 or more; and in which the thickness is 2mm or less. A uniform current density across the charged aerosol space sheet is provided by an emitter array comprising a large numerical density of emitter sources per unit area of the space sheet and a collector array have large numerical density of discharge elements per unit area.

It is often required to combine these requirements with a nozzle for conversion of the heat kinetic power. To accomplish this, a nozzle array may be provided containing in each nozzle, emitter and collector arrays with suitable exciter electrodes. The large area thin conversion space enables power conversion to occur within a space sheet of charged aerosol spaced from the wall, to avoid the wall shorting effect.

A feature of this invention is the use of arrays comprising a high number density per unit area of emitter and collector elements, which permits of a decrease in the conversion space length. This arrangement results in a more uniform charged aerosol having a higher current density and smaller exciter and output voltages. These factors result in a generator which is more compact and more efficient.

A feature of one embodiment of the present invention is the simultaneous formation of charged aerosol droplets over a large area by mixing a vapor and a cooler gas in the vicinity of a large area ion emitter array of high point density per unit area.

A feature of another embodiment of this invention is the employment of an emitter array comprising electrojet sources of charged droplets.

A distinguishing feature of this specification is the high number density of emitter per $mm^2$ which results in a small current emitter per emitter; but the total current per square millimeter is the current per point times the number of point per $mm^2$. This results in a greatly decreased voltage between the emitter and the exciter electrodes. A shorter conversion space can be employed.

A further feature of the invention is the provision of emitter arrays in which the minimum point density is related to the conversion length.

A further feature is an optimum geometry for an ion emitter array of high point density, an exciter, and an orifice plane, to provide maximum current at minimum exciter-emitter voltage.

Still another feature of the invention is an emitter array containing a plurality of emitters actuated by a single exciter electrode.

For a better understanding of the present invention, together with other details and features thereof, reference is made to the following description taken in connection with the accompanying drawings.

BRIEF DESCRIPTION OF THE FIGURES

FIG. 3 is a sectional view of a generator nozzle and its gas and vapor inlets showing one of the linear array of point emitters, with spacing symbols used in the mathematical analysis given hereinafter.

FIG. 4 is a cross sectional view taken on line 4—4 in FIG. 3, showing the linear array of point emitters.

FIG. 5 is a cross sectional view of another generator in accordance with the present invention showing an emitter array and associated structure. This view is taken along line 5—5 of FIG. 6.

FIG. 6 is a cross sectional view of the generator shown in FIG. 5 and is taken along line 6—6 of that view.

FIG. 7 shows a high density ionizer point array interspersed with vapor jet orifices, another embodiment of the present invention.

FIG. 7A is a cross sectional view taken on line 7a—7a in FIG. 7.

FIGS. 8A and 8B show emitter and collector arrays in an idealized converter, 8A being the front view of the array and 8B the side view of the array, with spacing symbols used in the mathematical analysis.

Figure 2:
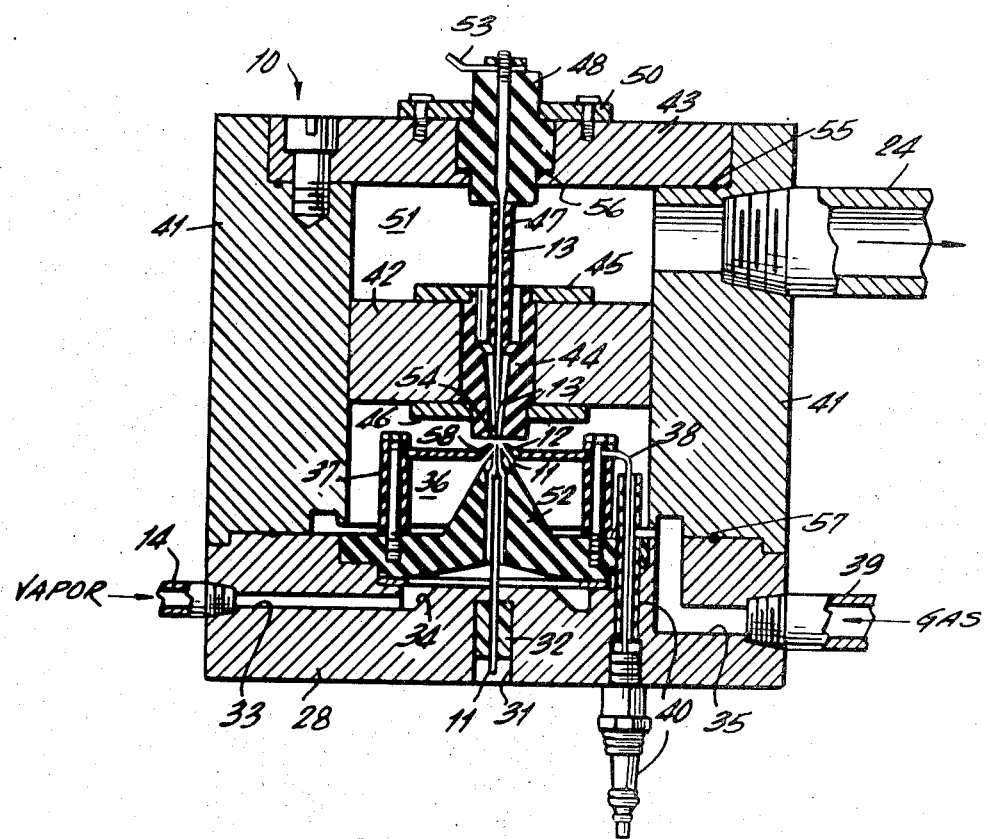
FIG. 2 is a cross sectional view of one form of the invention, showing the electrodes and the manner in which the gas and vapor are mixed.
Figure 9:
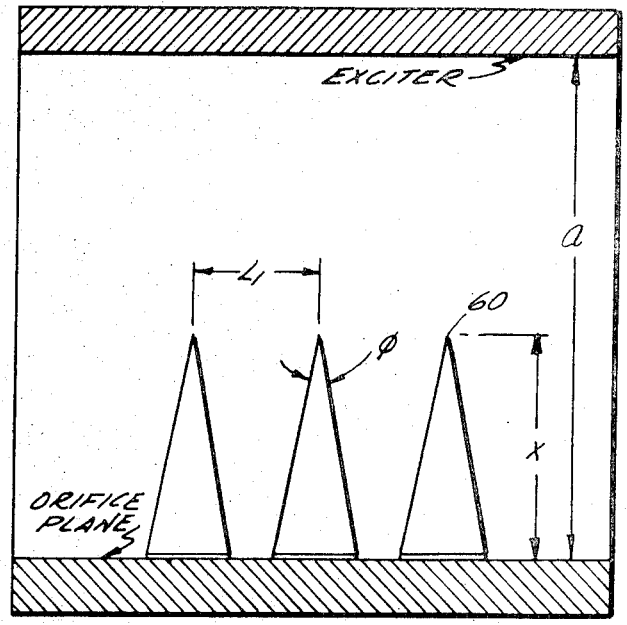
FIG. 9 shows an orifice point exciter geometry utilized in a test generator.

All graphs shown in FIGS. 10 to 14 inclusive are plots of experimental data for a linear array of point-emitters in air for no gas flow at STP, taken on the device shown in FIG. 2 having the geometry shown in FIG. 9.

Figure 10:
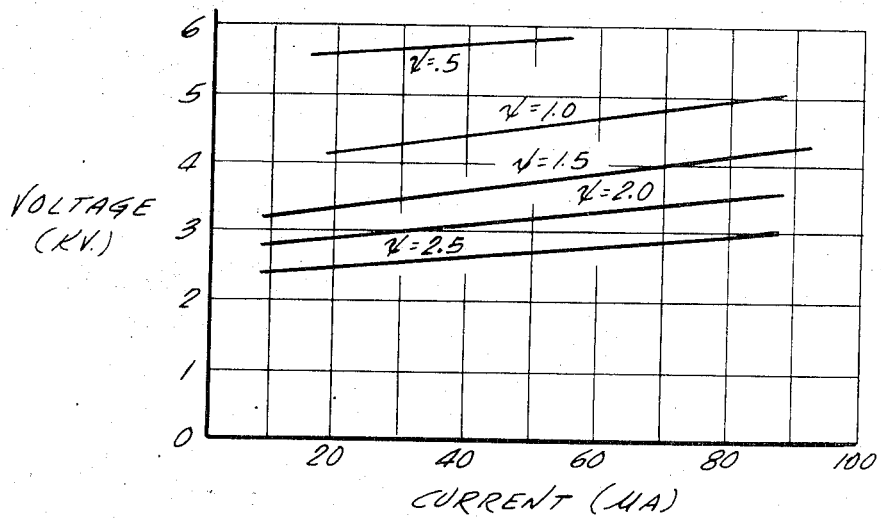

FIG. 10 shows the relationship between the voltage and current for a single point emitter for the orifice plane--exciter distance a = 4.51mm, and where the emitter-exciter distance $x$ varied.

Figure 11:
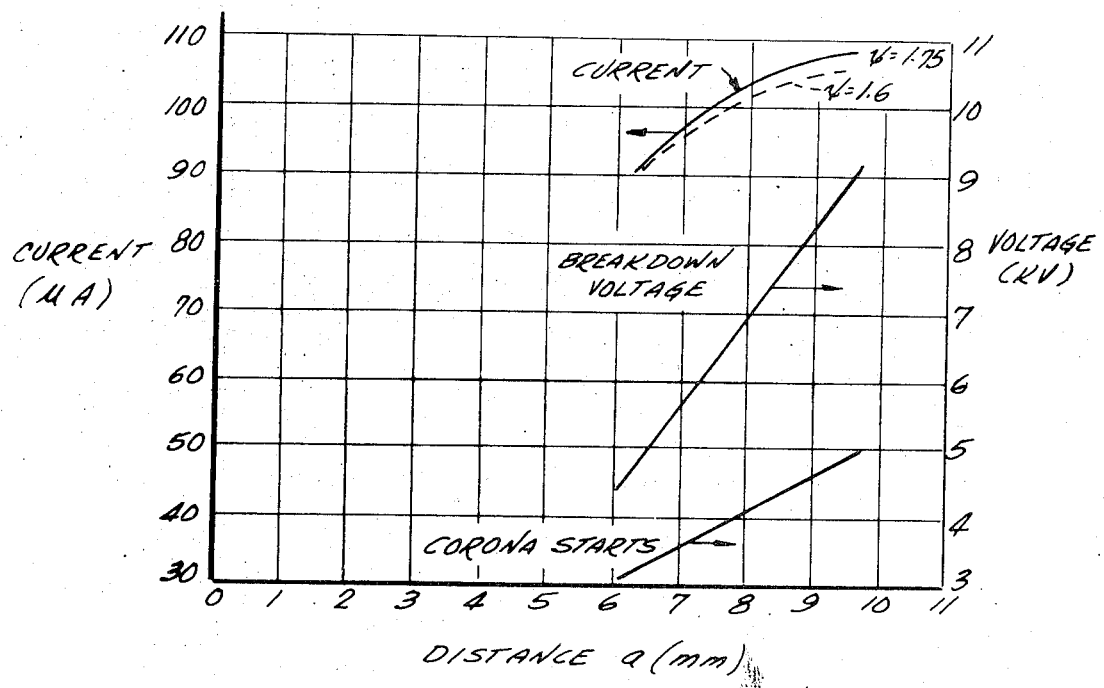

FIG. 11 shows maximum current and voltage versus the distance "a" between the exciter and orifice plane, for a fixed point emitter-exciter distance $x = 1.75$mm.

Figure 12:
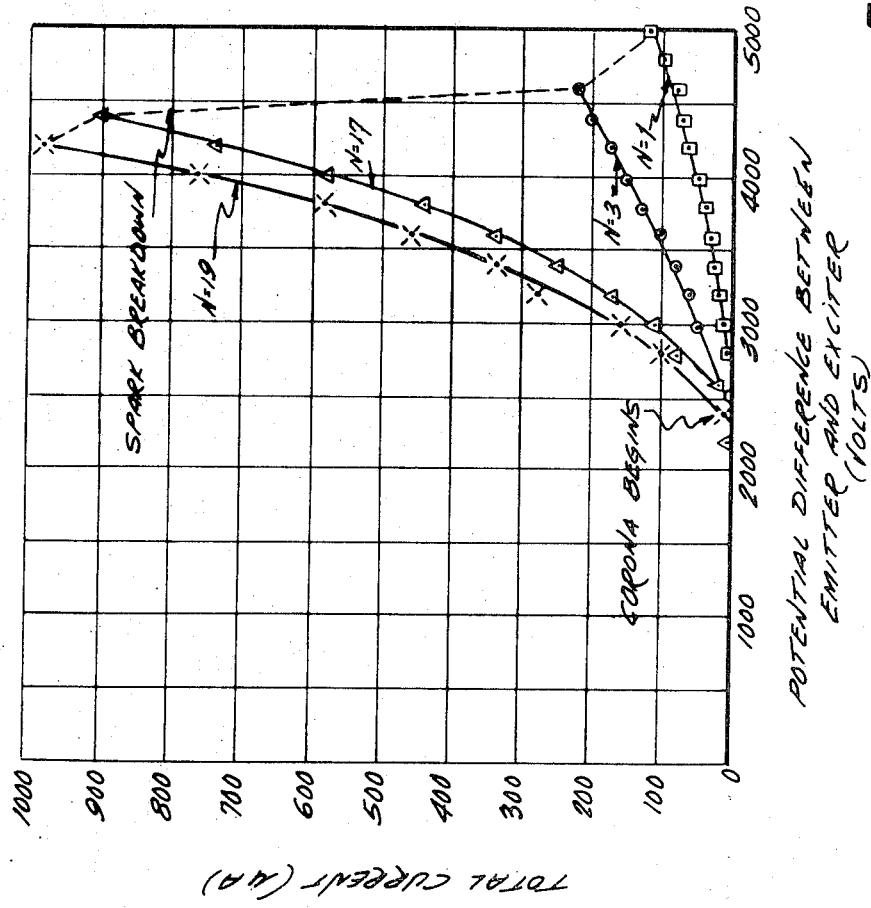

FIG. 12 shows the total current and potential difference between emitter and exciter for 1, 3, 17, and 19 points, for a = 9.4mm, $x$ = 4.5mm and $L_1$ = 2.3mm.

Figure 13:
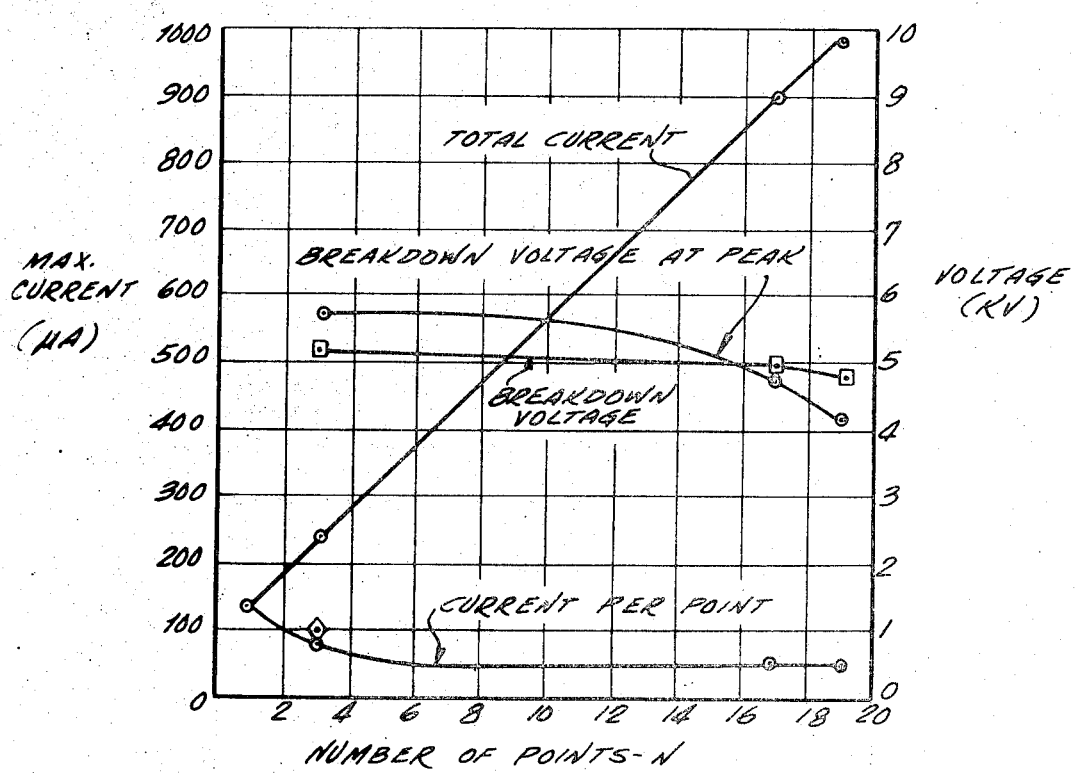

FIG. 13 shows a maximum current and breakdown voltage vs. number of points N, for a spacing of $L_1$ = 2.3mm; the maximum current per point $i_1$ vs. the number of points; and the peak breakdown voltage vs. the number of points N.

Figure 14:
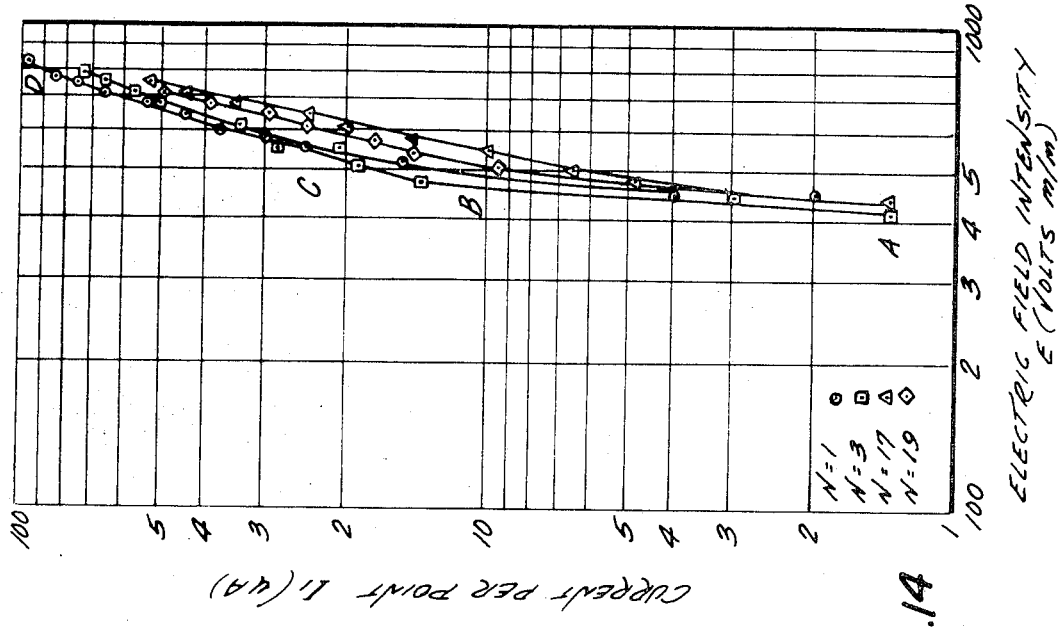

FIG. 14 shows a log-log plot of the electric field intensity E vs. $i_1$, the current per point for 1 to 19 points with = 9.4mm, $x$ = 4.5mm and $L_1$ = 2.3mm.

DESCRIPTION OF THE PREFERRED EMBODIMENT

Figure 1:
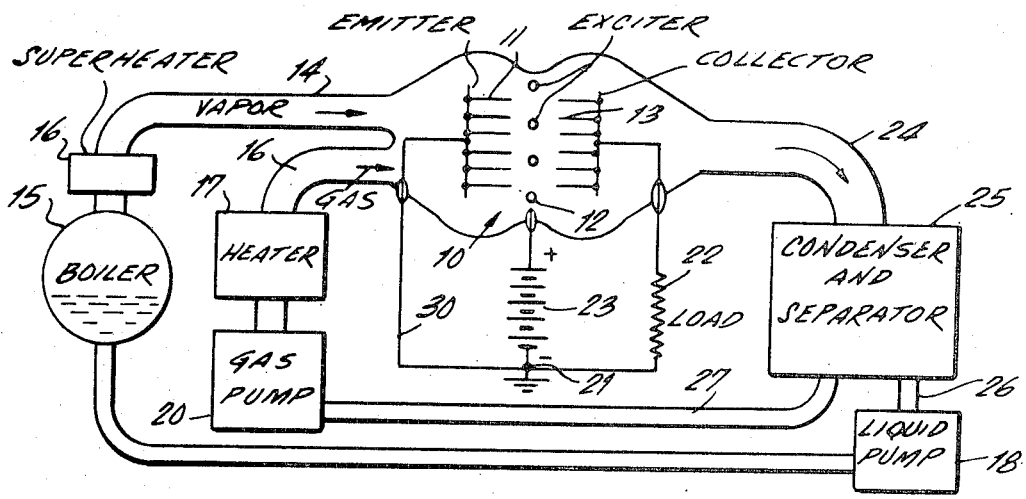
FIG. 1 is a schematic diagram of connections showing the entire system according to the present invention together with the pumps, condenser, and boiler necessary to operate the generator.

Referring now to FIG. 1, a complete generator closed loop system is shown diagrammatically in which the generator 10 includes an emitter array 11, an exciter array 12, and a collector array 13. The emitter side of the generator 10 receives a condensable vapor such as steam through a conduit 14 from a boiler 15 and a superheater 16, and a gas such as hydrogen or air through a second conduit 16 from a gas heater 17. The boiler 15 receives a vaporizable liquid such as water from a pump 18 and the gas heater 17 receives the gas from a gas pump 20. Power to supply the pumps 18 and 20 may be initially from an external source, but after startup may be bled off from this generator. Heat at a suitable temperature to vaporize the liquid in boiler 15, superheat the vapor at 16, and heat the gas in heater 17 is supplied by a heat source, not shown, which may be gas, oil or nuclear.

An optimum charged aerosol droplet of a small mobility necessary for power generation is formed by Mixture-Condensation of the vapor with a somewhat cooler saturated carrier gas to produce a droplet of about 200 A diameter around an ion from the emitter.

If ions or droplets were to have a much smaller diameter, they would have too large a mobility, which would cause too large a proportion of them to travel to the exciter electrode, rather than downstream to the collector electrode, with a consequent loss of power and efficiency.

The emitter point electrodes from an array 11 connected to a common terminal 21, which may be grounded. The collector point electrodes form an array connected to a first terminal of an electrical load 22. A second terminal of the load is connected to the emitter terminal 21. The exciter electrodes form an array 12 which are connected to a high potential low current source 23. Ions are emitted from points on the emitter array into the gas vapor. The potential source 23 may be, for example, a battery or another generator. As shown in FIG. 1, a single exciter electrode may serve to excite many emitter points.

After being discharged by the collector array, the aerosol is directed through conduit 24 to a condenser and separator 25. Here the aerosol liquid droplets are consolidated to a liquid body and return via pipe 26 and water pump 18 to boiler 15. The gas which may be hydrogen or air passes through conduit 27 to the gas pump 20, closing the loop back to the generator.

Referring now to FIG. 2, one form of generator is shown in cross section. In this device the emitter points 11 are grounded to the generator body. The base 28 supports an insulator 40 containing an axial lead-in-conductor 38 to the exciter electrode 12. Point emitter rod 11 is sealed in hole 31 by a gasket 32 to seal the high pressure vapor. The base 28 has a first conduit 33 for conveying the vapor from pipe 14 to an annular space 34 and the space surrounding the emitter points 11, and a second conduit 35 coupled to conduit 39 for conveying heated and compressed gas to the space 36. The emitter points 11 are connected to the grounded base. The exciter electrode 12, is connected to a voltage source (not shown). A stand-off insulator 37 is attached to the base 28.

A cylindrical block 41 is fitted onto the base 28 and supports two discs 42 and 43. Disc 42 supports an insulated slit nozzle 44 in which the conversion space 54 is located. Discs 45 and 46 retain the slit nozzle 44. The walls of the slit nozzle 44 are formed of insulating material such as aluminum oxide. The emitter points 11 and the collector points 13 comprise arrays. The collector potential is led off through a tubular insulator 47 and a block insulator 48. The block 48 is secured to disc 43 by disc 50. Gaskets 55, 56 and 57 seal the high pressure gases within the chamber 51. The space 51 between discs 42 and 43 acts as a reservoir for the deionized vapor gas mixture. Pipe 24 connects space 51 to the condenser and separator 25.

Gas and vapor are simultaneously introduced through pipes 39 and 14, respectively. The temperature of the carrier gas in the space 36 is maintained below the temperature of the vapor jets issuing from the orifices 58. The emitter array points 11 are axially located within the vapor jets issuing from orifices 58 as shown in FIG. 3. When an electric field is applied from the exciter electrode to the electrode points, ions are emitted into the vapor jet and cooler gas mixture. Gas vapor and ions are mixed and flow toward the slit nozzle droplets and a portion of the vapor condenses to form charged aerosol droplets of submicron size. Within the nozzle, the charged aerosol droplets in the carrier gas build up a space charge, and convert the heat-kinetic power of the gas stream to electric power suppled to collector array 13. The charged aerosol droplets are neutralized by ions of opposite sign from the points of the collector array 13, which is at a potential somewhat below the peak space charge potential at the exit plane of the conversion space 54. A connection to the electrode 13 is brought out above insulator block 48 where it is connected to a lug 53 and the load 22.

The generator shown in FIG. 2 uses a plurality of emitters mounted in a linear array, and a similar number of collector electrodes in another linear array. A linear or one dimensional array is shown in FIGS. 1–6, inclusive. Alternatively, the two dimensional array shown in FIGS. 7, 8A and 8B may be used.

Referring now to FIGS. 3 and 4, a generator with a slit nozzle 59 is shown in diagrammatic form with a linear array of 19 emitters connected together. The collector array 13 is identical to the emitter array 11. A single exciter electrode 12 comprises two parallel straight conductors 12A and 12B connected together to form a rectangular metal strip connected to conductor 38, and thence to a potential source 23 shown in FIG. 1.

FIGS. 5 and 6 show another generator arrangement. The plan view of the emitters indicates their spaced relation. As before a collector electrode 13 is positioned in axial alignment with each emitter 11. A single exciter plate 49 with aligned circular holes is used.

In FIGS. 7 and 8 there is shown a point emitter array 60 in which jets of vapor 61 such as steam, are emitted from orifices 62 formed at the interstices between the closely packed point emitters 63. In this figure a cooler carrier gas 64 is mixed with the vapor jets 61, which contain ions 65 emitted from the points 63. The cooler carrier gas 64 causes the steam jets 61 to condense about the ions to form charged aerosol droplets 66. In this point array every point is equi-distant from the exciter electrode 67, at a distance $R = a - x$, where $x$ is a minimum distance between the point on the array and the ground plane 68, and "$a$" is the distance between the ground plane 68 and the exciter electrode. Each point is subject to the same electric field intensity, and therefore emits the same current, providing a uniform current density across the entrance of the converter space.

Alternatively, vapor may issue from a porous medium 62a in which the points 63 are embedded.

An another alternative, in an electrojet emitter array having a large number of electrojet emitters per unit area, relatively low voltages applied during the formation of the charged aerosol droplets from the electrojet emitters, may enable the uniform formation of an optimum charged aerosol.

FIG. 8A shows the idealized geometry of a two dimensional array employed in providing a charged aerosol "sheet" of large cross section and small thickness L, corresponding to a conversion length L. The FIG. 8A shows a unit area of the "sheet", comprising an emitter or collector array having a spacing between points = $L_1$. The FIG. 8B shows a section through this "sheet" showing the separate emitter and collector arrays; and an arrow U shows the direction of the velocity of the moving charged aerosol which constitutes the current thru the "sheet" conversion space.

FIG. 9 shows the geometry of a linear emitter array 60 of 19 points and orifices used for tests on a power converter of this invention. Spacing symbols are indicated together with the dimensions used in the experimental tests shown in FIGS. 10 through 14 inclusive. For the emission of a maximum current from this array at incipient spark breakdown in air at STP, optimum ratios found from these tests were $(x/L_1) = 1.68$, $(a/x) = 2.43$; and $(a-x)/L_1 = 2.41$. The maximum current from the 19 points was about 1 milliamp with no gas flow, and about 1.5 milliamps when air flows through the 19 orifices surrounding the points.

It is preferred to employ a greater point density so that the current emitted from each point is substantially less that this maximum current, which results in a decrease in the potential difference between the exciter and the emitter points.

The discovery on which the present invention is based is shown in FIG. 14, in which the electric field intensity between the emitter and exciter electrodes decreases as the current per point decreases, however, the total current may be kept constant by increasing the number of points per unit area. Equation (13) shows the relationship between the emitter-exciter electric field intensity and the point density. This is further discussed below on Page 16, lines 9 through 12.

A decrease in current per point from 10 μa to 1 μa per point results in a decrease of the emitter-exciter electric field intensity from 480 to 420 volts per millimeter. A single controlling spaced point at 90 micron amperes per point required an emitter-exciter electric field of 900 volts per millimeter. Utilizing a still greater number of points the voltage may be still further decreased.

A further advantage of an increased emitter point density is that a more uniform current density can be obtained, and the conversion length may be decreased. This decrease in conversion length has the advantage of enabling higher currents and lower voltages to be obtained during the power conversion.

In practice, the decreased field intensity is obtained by utilizing at least one point per $mm^2$.

Projecting a linear increase in current with pressure, at 40 atmospheres a maximum current of 60 milliamps may be expected from the 19 points per $cm^2$.

At an output power density of 1 $KW/cm^2$ at 100KV and 40 atmospheres then the maximum current density is:

$$i = 10^3/10^5 = 10^{-2} \text{amps/cm}^2 \text{ or } 10 \text{ma/cm}^2.$$

Consequently, the present ionizer is adequate to supply the current required for 1–10 $KW/cm^2$ power density.

In the tests shown in FIGS. 10–14 inclusive important new relationships were discovered between the point density and the electric variables in an electrogasdynamic generator. The maximum current per point at incipient breakdown decreased exponentially with the number of points to 5 points; and reached an asymptotic constant value as the number of points increased. For more than 5 points, the maximum current is approximately proportional to the number of points. For maximum current emission there is an optimum distance of the emitter points between the ground plane and the exciter electrode. The exciter voltage decreases with point density. There is a minimum point density $n$ for a given conversion length L needed to provide the charged aerosol current at maximum power density. The minimum point density is proportional to gas velocity and inversely proportional to the converter length; and is independent of gas density and power density. A greater point density than the theoretical minimum is required to provide a uniform charged aerosol distribution for conversion lengths under 5mm; and to decrease exciter voltage.

The generator shown in FIG. 2 employs the Mixture-Condensation Process in which charged aerosol droplets are produced by the Condensation of steam jets onto ions induced by mixing the steam jets with a cooler carrier gas. In the Expansion-Condensation Process an almost saturated vapor at the inlet to the nozzle is subsequently cooled by expansion only in the presence of ions to form charged aerosol droplets.

Comparing experimental results obtained with the generator of FIG. 2, which employed the Mixture-Condensation Process with the results obtained with the Expansion-Condensation Process, the power density increased 2.8 times at the same gas density. The charged aerosol breakdown factor for the Mixture-Condensation Process was $k_2 = 1.12$ for water vapor-nitrogen compared to a charged aerosol breakdown factor for the Expansion-Condensation Process of $k_1 = 0.67$ for water vapor-air; $(_2/k_1)^2 = 2.8$.

In FIG. 8B the charged aerosol particles 66 are shown in a conversion space 70, which comprises a large area sheet of thickness L. In a very thin sheet the charged aerosol gas may flow through with little or no change in velocity, and electric power output results from a decrease in heat power, temperature and pressure across the sheet conversion space. However, in sheets where $d/L < 25$, a small increase in the diameter of the sheet from the entrance to the exit plane enables a considerable electric power output to be obtained from a corresponding decrease in kinetic power.

MATHEMATICAL PHYSICS ANALYSIS

SYMBOLS

See FIGS. 3, 4, 7, 8A, 8B and 9 showing symbols relating to the emitter and collector geometry.

- $a$ = distance of orifice plane to exciter electrode
- $a_1 = (b_o^2 \epsilon_o/2) (bk)^2 = 42 (b_o k)^2$ power constant
- $a_2 = (\epsilon_o b_o/\bar{i_1}) (b_o k)$ array constant
- $a_3 = (b_o^2 \epsilon_o/\delta_a) = 72$, friction constant
- $b_o$ = relative electric breakdown factor of the carrier gas; or, the ratio of the electric breakdown intensity of the carrier gas to that of air, at standard conditions.
- $b_o = 3.08 \times 10^6$ volts/m., which is the approximate electric breakdown intensity of free air at standard conditions.
- $C$ = Sonic velocity at STP.
- $d$ = diameter of conversion space or charged aerosol "sheet"
- $E$ = electric field intensity
- $E_o, E_1$ = particular values of E
- $I$ = total current from N emitters
- $i$ = current density
- $i_1$ = a particular value of the current per point
- $i_o$ = a particular value of the current per point
- $k$ = breakdown strength of the charged aerosol relative to the gas
- $L$ = length of conversion space and thickness of charged aerosol "sheet"
- $L_1$ = length between emitter points of array
- $m_r$ = relative molecular weight, compared to air (28.8)
- $N$ = number of emitter points
- $n$ = number of emitter points per unit area, or point density
- $n_o$ = reference point density, 20/cm²
- $p_\epsilon$ = electric power density watts/m²
- $q$ = exponential constant
- $T_a$ = absolute temperature (300° K) = 1
- $U$ = the carrier gas velocity in m/s
- $V$ = voltage
- $x$ = distance of emitter points from orifice ground plane

GREEK SYMBOLS

- $\delta_a$ = relative density compared to the same gas density at standard temperature and pressure (STP) – ($10^5$ newtons/m² and 300° K, or approximately 1 atmos and 27° C)
- $\epsilon_o = 8.85 \times 10^{-12}$ permittivity of free space farads/m.
- $\beta = L/L_1$ the ratio of converter/array length
- $\eta_k$ = kinetic/electric power conversion efficiency

SUPERSCRIPTS AND SUBSCRIPTS

- ¯ = maximum value
- _ = minimum value
- $ex$ = exciter
- $in$ = input
- $out$ = output

EQUATIONS

MAXIMUM CURRENT VERSUS NUMBER OF POINTS

FIGS. 10-14 inclusive summarize the experimental results with static tests of the multipoint ionizer (1–20 points) with no gas or vapor flow at STP.

Curves were fitted to the observations, using the following empirical equations:

The maximum current per point $\bar{i_1}$ versus the number of points N:

$$\bar{i_1} = (\bar{I}/N) = 80e^{-(N-1)/2} + 50 \ \mu A \tag{1}$$

The total peak current I versus the number of points N:

$$I = N[80e^{-(N-1)/2} + 50] \ \mu A \tag{2}$$

The optimum configuration had these parameters:

$$a = 9.4 \text{mm}; \ L_1 = 2.3 \text{mm}; \ 3.5 < x < 4.5 \tag{3}$$

The equation (2) becomes approximately linear with N on the condition that: $N \leq 5$. Hence for $5 < N < \infty$ and for $i_1 = 50 \ \mu A$/point $\tag{4}$ $$\bar{I} = N\bar{i_1} \tag{5}$$

It is known that in a charged aerosol generator the maximum current $\bar{I}$ versus the relative density $\delta_a$ is:

$$\bar{I} = N\bar{i_1} \delta_a \tag{6}$$

To obtain a result in terms of $n$, the number of points per unit area for the given current density, divide (6) through by the flow area $A$:

$$i = i_1 n \delta_a \tag{7}$$

CURRENT PER POINT VERSUS ELECTRIC FIELD INTENSITY

The curve of FIG. 14 which shows the exciter-emitter electric field intensity $E$ versus the current per point $i_1$ falls into two distinct regions $AB$ and $CD$ approximately by straight lines having the empirical equation:

$$i_1 = i_o [1 + (E/E_1)^q] \tag{8}$$

In the range $BC$ the curvature changes and the equation (8) cannot be used.

For the range $AB$: 1-6 $\mu A$/point, the constants in Equation (8) are:

$$i_o = 1$$
$$E_1 = 420$$
$$q = 18$$

Thus:

$$i_1 = 1 + (E/420)^{18}$$

(9)

For the range $CD$: 25-50 $\mu A$/point, the constants in Equation (8) change:

$$i_o = 10$$
$$E_1 = 440$$
$$q = 3$$
$$i_1 = 10 [1 + (E/440)^3]$$

(10)

The decrease in the exponent $q$ may be due to increased space charge at greater current densities. This space charge is also decreased under dynamic conditions.

FIG. 14 may be extrapolated to a smaller current per point and a greater point density, by extending the straight line $AB$:

$$E = E_o - (E_o - E) \log_{10} (\overline{i_1}/i_1)$$

(11)

The current per point in terms of the point density $n$ is $$i_1 = \overline{i_1} \, n_o/n$$

(12)

From (11) and (12) the relation between the point density $n$ and the emitter-exciter electric field intensity is:

$$E = E_o - (E_o - E_1) \log_{10} (n/n_o)$$

(13)

Equation (13) shows that with an increased point density there is a decreased voltage between the emitter points and the exciter electrode. Thus, as $i_1$ is decreased from 10 to 1 $\mu A$ per point, the electric field intensity decreases from 480 to 420 volts/mm, a decrease of 60 volts per decade. In a generator test there were 20 points/cm², or $n_o = 0.2$ point/mm² for which $i_1 = 50$ $\mu A$ and $E_o = 500$ volts/mm.

Evaluating (13) from this data:

$$E = 500 - 60 \log (n/0.2)$$

(14)

It is now known that the output electric power density of the charged aerosol generator is:

$$p_\epsilon = (b_o^2 \epsilon_0/2) \, b_g^2 k^2 \delta_a^2 U = a_1 \delta_a^2 U$$

(15)

where $(b_o^2 \epsilon_0/2) = 42$ (mks unit system)
where $a_1 = 42 (b_g k)^2$
The factor $a_1$ may be computed from (15) using these readily measured factors:

$$a_1 = p_\epsilon / \delta_a^2 U$$

(16)

It is also now known that the output electric power density is also expressed:

$$p_\epsilon = i^2 L^2 / 2 \, \epsilon_0 U$$

(17)

Combining equations (7), (15) and (18), there is obtained $$\underline{n} = a_2 (U/L)$$

(18)

The result (18) enables the calculation of the minimum point density $\underline{n}$ for a charged aerosol generator operating at maximum output power density. The result shows the $\underline{n}$ is independent of the relative gas density $\delta_a$. Evaluating the array constant $a_2$, using $i_1 = 50$ $\mu A$/point and $b_g k = 1$. $a_2 = (\epsilon_0 b_o/\overline{i_1})(b_g k) = 8.85 \times 10^{-12} \times 3 \times 10^6/50 \times 10^{-6} \times 1 \times 1 \cong 0.5$   (19)

The spacing $L_1$ between the points on a square array of a minimum point density $\underline{n}$ is:

$$L_1 = 1/\sqrt{\underline{n}}$$

(20)

From (18) and (20):

$$L_1 = (L/a_2 U)^{1/2}$$

(21)

By definition: $\beta = L/L_1$ and from (21):

$$\beta = (a_2 U L)^{1/2}$$

(22)

For $\beta = 1$:

$$L = L_1 = 1/a_2 U$$

(23)

To uniformly produce and distribute the charged aerosol in the conversion space it is required that $L_1 \leq 2L$, that is $\beta \geq 0.5$ for the charged aerosol to be uniformly produced and distributed in converters where $\beta < 0.5$ the point density n must exceed the minimum point density $\underline{n}$.

To decrease the voltage between the emitter points and the exciter electrode the point density $n$ must greatly exceed the minimum point density, to decrease the current per point below the maximum current. Operating the emitter points below their maximum current output decreases the possibility of spark breakdown; there is less wear on the points, and the operation is more reliable.

In the generator shown in FIG. 2 the conversion length $L = 7.9$mm and $L_1 = 2.3$mm for 20 points; and $L_1 = 16.7$ for 2 points. To compute $\beta$ for this configuration for 20 points $\beta = 7.9/2.3 = 3.4$; and for 2 points $\beta = 7.9/16.7 = 0.47$ The latter $\beta$ is too small and will not provide uniform distribution of charged aerosol in the conversion space.

A decreased converter length $L < 1$mm, is advantageous since for the same output power density, $p_\epsilon$:
1. The generator output voltage V is decreased.
2. The exciter voltage is decreased.
3. The generator output current I is increased.

For small converter lengths $L < 5$mm the point density n must exceed the minimum point density to provide a uniform distribution of the charged aerosol in the converter space.

$$V = 2.37 \times 10^5 (p_\epsilon /U)^{1/2} L \quad (24)$$

or alternatively:

$$V = 1.54 \times 10^6 (b_g k)\, \delta_a\, L \quad (25)$$

Examples:
1. Given: $E = 460$ volts/mm
 Find: $i_1$
 Answer: $i_1 = 1 + (460/420)^{18}$
 $\beta = 6.0\ \mu A$/point
2. Given: $E = 660$ volts/mm
 Find: $i_1$
 Answer: $i_1 = 10\,[1 + (1.5)^3\,] = 44\ \mu A$/point
3. Given: A point emitter array in which $L_1 = 0.072$ mm (approx. 3 mil)
 $n = 196$ points/mm
 Find: The emitter-exciter field intensity
 Answer: $E = 500 - 60 \log(196/0.2) = 320$ volts/mm
4. Given: $p_\epsilon = 1$ KW/cm² $= 1.10^7$ watts/m²
 4.1—$L = 1$mm $= 10^{-3}$m
 4.2—$L = 0.25$mm $= 0.25 \times 10^{-3}$m
 4.3—The emitter-exciter distance is 0.2mm in (4.1)
 4.4—The velocity is 360mm/sec and $(b_g k) = 1$
 Find: Output voltage $V$ (a) in 4.1 and (b) in 4.2 current density in 4.2; and (c) the minimum point density $n$, $L_1$ and $\beta$; and (d) exciter voltage for 4.3
 Answer: From (27)
 (a) $V = 2.37 \times 10^5\,(10^7/360)^{1/2}\,10^{-3}$
  $V \cong 40{,}000$ volts
 (b) For $L = 0.25$mm (10 mils)
  $V = 10{,}000$ volts
  $i = 1{,}000$ amps/m² or 0.1 amp/cm²
 (c) $n = 0.5\,(360/10^{-3}) = 1.8 \times 10^5$ points/m²
  $n = 0.18$ points/mm²
  $L_1 = 1/\sqrt{n} = 1/\sqrt{0.18} = 2.3$mm
  $\beta = L/L_1 = 1/2.3 = 0.45$ The test with an ionizer array performed without gas flow in air at 1 atmos and 300° K gave the following experimental results:

A peak current was obtained with $x = 4$ to 4.5mm. A value $L_1 = 2.3$mm, and $2 = 9.4$ was chosen so that $V$ would not be too great. The distance $x$ between the orifice ground plane and the emitters was varied. The number of points $N$ was varied.

A single point gave the largest current before breakdown. Increasing the number of points causes a decrease in the maximum current per point before breakdown; but as the number of points increases, the maximum current per point reaches an asymtotic constant value.

With more than 5 points the maximum current is nearly proportional to the number of points $N$, or about 55 $\mu A$/point.

For 19 points, a maximum current of 980 $\mu A$ or about 1 milliamp was obtained at a voltage $V = 4.2$KV.

When air at 50 psi was applied to the orifices, moist air jets issued from the orifices and the total current increased to 1.5 milliamps.

The breakdown voltage $V$ decreased slightly as $N$ increases, because of an increased probability that spark breakdown will occur; and also possibly due to small variations in distance $x$.

The current $I$ increases with the distance to the exciter, but the potential difference $V$ also increases proportionally.

The $V$–$I$ characteristics showed a great increase in current $I$ above a critical value of $V$.

The maximum current per point $i_1$ decreases exponentially to a constant value as $N$ increases.

The maximum total current $I$ increases approximately linearly with the number of points, $N$.

The emitter-exciter potential difference decreased to a minimum of about 525 volts/mm for $N = 19$ points at maximum current.

The minimum point density $\underline{n}$ in an emitter array is proportional to the gas velocity $U$, and inversely proportional to the length of the conversion space $L$, and is independent of the output electric power density $p_\epsilon$ and the relative gas density $\delta_a$.

The exciter voltage and current decreases and hence the input electric power loss is decreased as $n$ increases.

The voltage drop between the collector array and the peak potential of a charged aerosol decreases as the collector point density increases.

Above 30 atmospheres it is known that the current from a single point departs from linearity and reaches a maximum. The use of multiple points assures that as much relationship as required can be drawn to maintain the required linear relationship between voltage, current and gas density for maximum electric power output, at all pressures, including pressures in excess of 30 atmospheres.

The charged aerosol electric breakdown factor k for the Mixture-Condensation Process with supercooled steam jets entering a cooler gas was $k = 1.12$; compared to the Expansion-Condensation Process for water and ethanol vapor in air for which the charged aerosol electric breakdown factors are $k = 0.67$ and 0.87 respectively.

The output power density produced by the Mixture-Condensation Process is greater than the output power density produced by the Expansion-Condensation Process by a factor of 2.75 times.

In the Mixture-Condensation Process the condensation is independent of the strong expansion as required in the Expansion-Condensation process. The kinetic/electric power conversion efficiency with steam and a nitrogen carrier extrapolated to $\delta_a = 53$ (53 atm) is 3.2 percent per stage with air. For steam and hydrogen (H₂) as the carrier gas; $m_r = 1/14$; $b_g = 0.67$; and the extrapolated efficiency is $\eta_k \cong 20$ percent/stage.

An emitter array of 20 points/cm² provides a more than adequate current density by a factor of 10. This ionizer array should serve for the higher pressures and output power density at 100 atmospheres or more.

The minimum point density $n$ is independent of the gas density and the maximum output power density.

For the same output current density, a larger emitter point density $n$ results in smaller current per point $i_1$. A decreased current per point results in a decreased exciter-emitter electric field intensity.

A larger collector array point density results in a decreased voltage drop between the charged aerosol and the collector.

The arrays described herein have emphasized ion emitting point arrays. However, the principles involving point density per unit area vs. converter length are also applicable to electrojet emitters of the type described in U.S. Pat. No. 3,191,077. This specification is not limited to point emitters, but includes electrojet emitters.

An electrogasdynamic power generation method has been described which employs a charged aerosol moving through a sheet conversion space, an emitter and exciter array to form and charge the aerosol droplets at the entrance plane, and a collector array to discharge the charged aerosol droplets at the exit plane; and for which various methods of charging and forming an optimum aerosol, previously described are employed.

Having thus fully described the invention, what is claimed as new and desired to be secured by Letters Patent of the United States, is:

1. In a power conversion device utilizing a charged aerosol as a transducer, an emitter array comprising a plurality of charge emitters to form and charge the charged aerosol, a conversion space to convert the heat kinetic power of the charged aerosol to electric power, an exciter electrode for the emitters, said emitters per unit area exceeding the number of exciter electrodes per unit area by a minimum point density of at least five points per exciter electrode, and a collector array for discharging the charged aerosol and transmitting the electric power to an external load.

2. A device according to claim 1 in which the emitter array per exciter electrode exceeds the minimum point density by one or more orders of magnitude and in which the distance between the exciter electrode and the emitters is less than 2mm whereby the potential difference between emitter and exciter electrodes is less than 1,000 volts, wherein the minimum point density is $n=a_2(U/L)$ where $a_2$ is the array constant and is of the order of 0.5, $U$ is the velocity of the charged aerosol in meters per second, and $L$ is the length of the conversion space in meters. (whereby ions are emitted to form a charged aerosol in the conversion space at maximum current density at incipient spark breakdown.)

3. A device according to claim 2 in which the conversion space length is less than 2 millimeters and in which the arrays exceed 1 point per mm² employing less than 100 volts potential difference between emitter and the exciter electrode, providing output electric power at less than 10,000 volts.

4. A device according to claim 1 in which a mixture condensation process is employed to charge and form the charged aerosol.

5. A device according to claim 4 in which superheated vapor is emitted from orifices between the point emitters.

6. A device according to claim 1 in which the emitter exciter and collector arrays comprise linear arrays.

7. A device according to claim 1 in which the conversion space is in the form of a large area, thin sheet in which the ratio of diameter to conversion length is at least five to one.

8. A device according to claim 7 in which the said large area and short length conversion space is bounded by an array of nozzle elements, a planar array of emitters and a planar array of collectors.

* * * * *

UNITED STATES PATENT OFFICE
CERTIFICATE OF CORRECTION

Patent No. 3,792,293   Dated February 12, 1974

Inventor(s) Alvin M. Marks

It is certified that error appears in the above-identified patent and that said Letters Patent are hereby corrected as shown below:

Column 1, line 65, after "heat kinetic power" insert -- to electric power --. Column 3, line 30, before "=", first occurrence, insert -- a --. Column 4, line 57, "suppled" should read -- supplied --. Column 7, line 12, "$(_2/k_1)^2$" should read -- $(k_2/k_1)^2$ --; line 43, "$\div$" should read -- " --. Column 8, line 29, "I" should read -- $\bar{I}$ --. Column 11, line 28, "360mm" should read -- 360m --. Column 12, line 28, "relationship" should read -- current --. Column 14, line 2, "n" should read -- $\underline{n}$ --.

Signed and sealed this 15th day of October 1974.

(SEAL)
Attest:

McCOY M. GIBSON JR.        C. MARSHALL DANN
Attesting Officer          Commissioner of Patents